United States Patent [19]

Boag et al.

[11] 3,963,924

[45] June 15, 1976

[54] METHOD AND APPARATUS FOR TAKING X-RAY PICTURES

[75] Inventors: John Wilson Boag, Sutton; Paul Nelson Jeffery, Chandler's Ford, both of England; Harold Elford Johns, Toronto, Canada

[73] Assignee: National Research Development Corporation, London, England

[22] Filed: June 26, 1974

[21] Appl. No.: 483,432

[30] Foreign Application Priority Data

June 23, 1973 United Kingdom ............... 30682/73

[52] U.S. Cl. ............................. 250/315 A; 250/374

[51] Int. Cl.[2] ........................................ G03B 41/16

[58] Field of Search ............... 250/315, 315 A, 374; 346/74 EB, 74 ES

[56] References Cited

UNITED STATES PATENTS

| | | | |
|---|---|---|---|
| 3,766,385 | 10/1973 | Morsell et al. | 250/315 A |
| 3,774,029 | 11/1973 | Muntz et al. | 250/315 A |
| 3,803,411 | 4/1974 | Reiss | 250/315 A |
| 3,813,546 | 5/1974 | Prondian | 250/315 A |
| 3,828,192 | 8/1974 | Morsell | 250/315 A |
| 3,832,546 | 8/1974 | Morsell et al. | 250/315 A |
| 3,859,529 | 1/1975 | Prondian et al. | 250/315 A |

*Primary Examiner*—Archie R. Borchelt
*Assistant Examiner*—B. C. Anderson
*Attorney, Agent, or Firm*—Cushman, Darby & Cushman

[57] ABSTRACT

A method and apparatus for taking x-ray pictures by ionography wherein the object to be studied is radiated by x-rays which fall on an ionization chamber. The ionization chamber includes a pair of electrodes at least one of which is in the form of a flexible sheet which includes a conductive layer and an insulating layer for collecting on the surface thereof ions generated in the chamber. Both of the electrodes have substantially spherically curved surfaces with their respective centers of curvatures located at the source of ionizing radiation. The flexible sheet is formed into a spherically curved shape by establishing a differential gas pressure across the sheet.

7 Claims, 11 Drawing Figures

Figure 1:
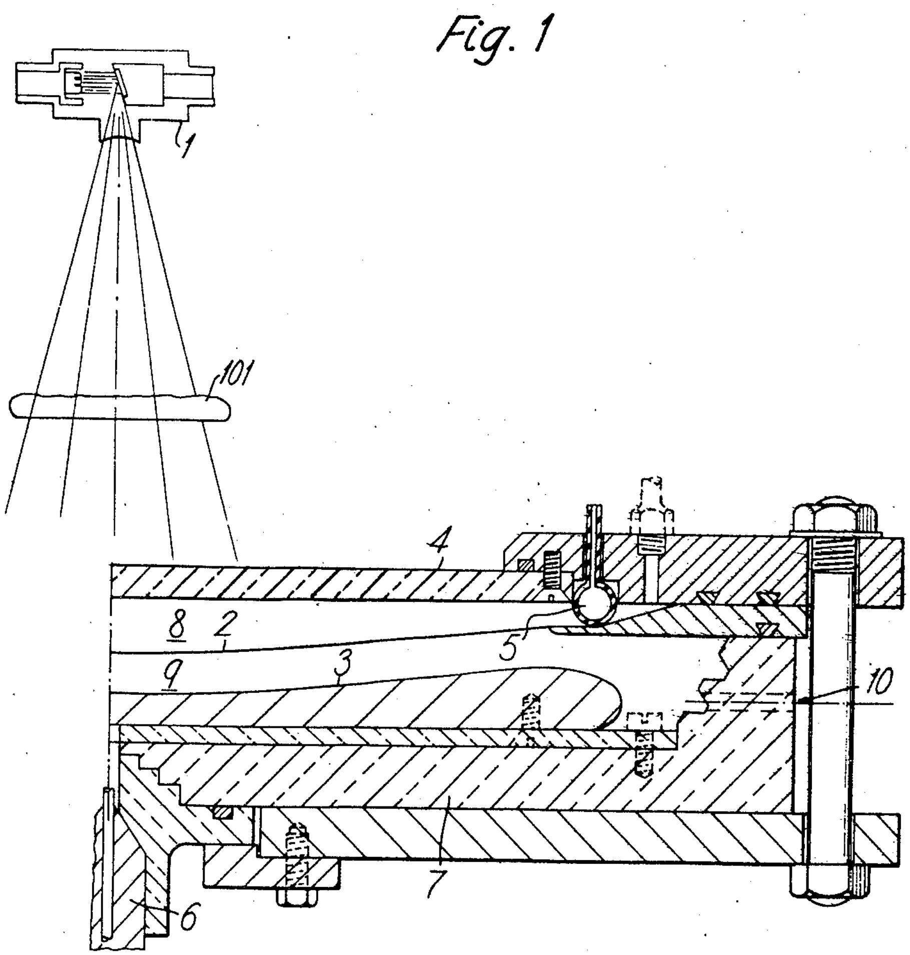

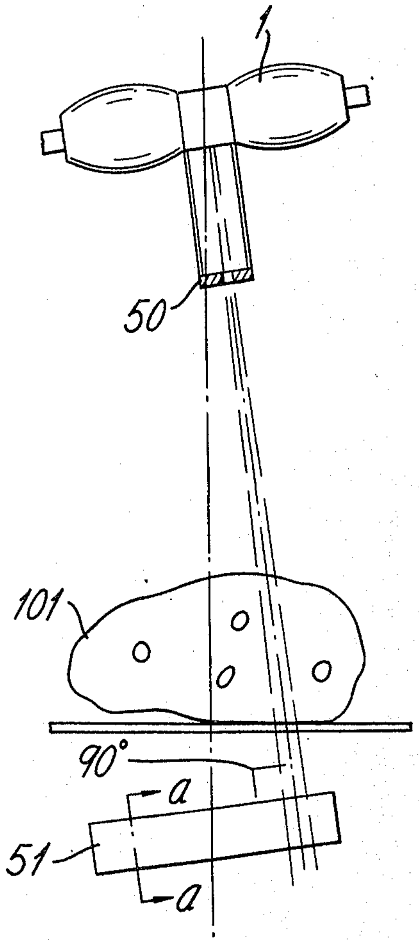
Fig. 7
Section on a-a
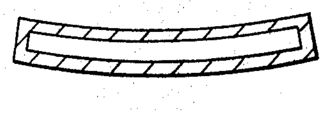

Fig. 8
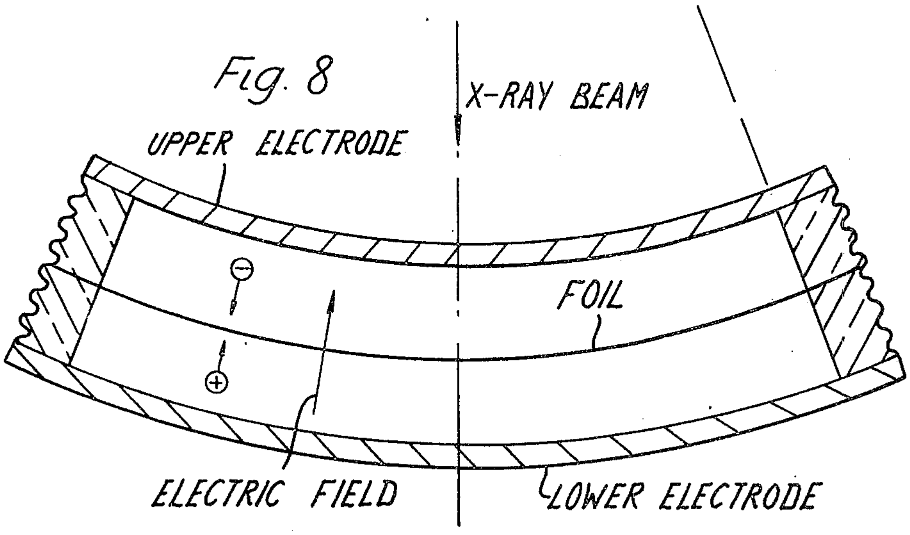
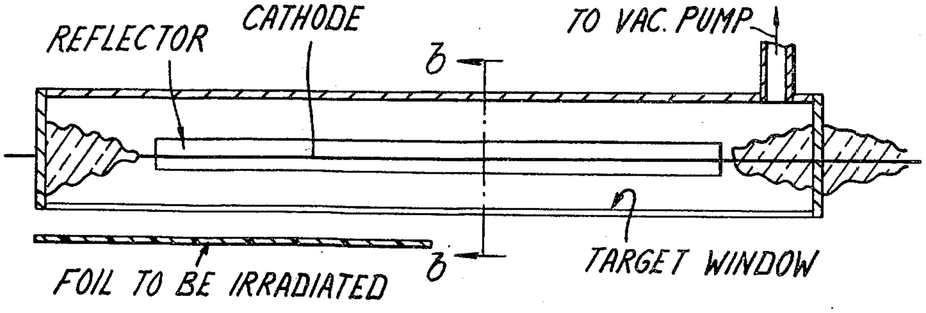
Fig. 9a
Fig 9b
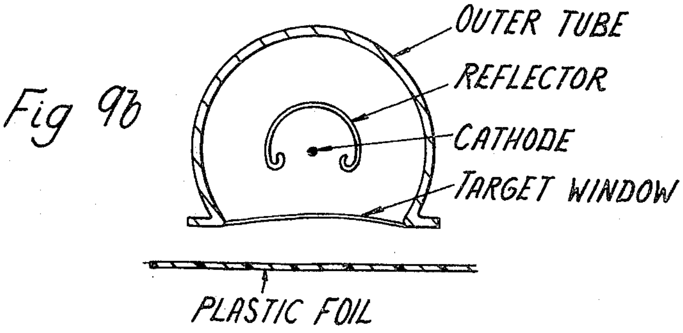

METHOD AND APPARATUS FOR TAKING X-RAY PICTURES

The present invention concerns taking X-ray pictures by ionography. Hitherto, the photographic film has been the preferred and, until recently, the only recording medium available for medical and industrial radiography.

Ionography consists of forming a latent image of the radiograph as a distribution of electric charge on an insulating surface - and as such does not involve selenium or any other photoconductor. Instead of forming the image by subtraction from an initially uniform distribution of charge, the image can be built up by collecting ions on the surface of an insulating foil stretched over one electrode of an ionization chamber, these ions having been formed by the radiation in a layer of a suitable gas occupying the space contiguous with the foil. This latent image formed by the electrical charge pattern can be rendered visible ("developed") in a variety of ways - usually by exposing it to an aerosol of charged powder particles. The powder adheres to the foil in the regions of high field strength and thus outlines the boundaries of areas of different charge density. The image resulting from this method of development shows a peculiar contrast pattern in which sharp steps in the charge density are emphasised and this 'edge contrast' is particularly valuable in rendering visible blood vessels, cysts and tumours in soft tissues where density differences, though small, are sharply defined. This technique has therefore potentially important application in such as mammography.

Known designs for ionography have previously employed flat electrodes or electrodes with a convex curvature facing the x-ray target. With these designs there is an inherent loss of resolution due to the obliquity of the primary undeflected x-ray quanta with respect to the collecting field. Successive quanta following one another along the same path will sometimes produce an ion close to one electrode surface and sometimes close to the other electrode. Unless the lines of force of the collecting field are strictly parallel to the quantum paths these ions, formed by successive quanta at different depths in the gas layer, will not be deposited at the same point on the insulating foil on which the charge distribution forming the latent image is built up. The resulting charge distribution will therefore fail to represent accurately the intensity of the primary x-ray quanta which have passed through the object so good resolution will be impossible to achieve. Some loss of resolution will, of course, inevitably occur for a quite different reason. This arises from the finite range and wide angular distribution of the secondary electrons ejected from gas molecules by the primary x-ray quanta. The ions formed along the tracks of such secondary electrons will cluster around the paths of the primary quanta but will not lie precisely on them. The range of such secondaries can be adequately restricted, however, by maintaining a moderate gas pressure of several atmospheres within the ionization chamber. It has been shown elsewhere on theoretical grounds and demonstrated experimentally that this unavoidable loss of resolution need not be serious in practice, whereas any obliquity between the quantum paths and the lines of force of the collecting field can cause complete blurring of fine detail especially near the edges of a wide picture. The alternative methods of avoiding this geometrical loss of resolution - viz. by using only a very narrow gap between the electrodes in the ionisation chamber - has the disadvantage of greatly reducing the efficiency of the ionization chamber and thus increasing the dose of radiation which has to be given to the patient during a radiological examination.

According to one aspect of the present invention there is provided a method of taking x-ray pictures of an object comprising passing through the object ionizing radiation having a defined band of quantum energy, and subsequently passing the ionising radiation onto an ionizing chamber containing a layer of gas at least some of whose atoms have a capacity for selective absorption of radiation having a quantum energy slightly below the quantum energy of said ionizing radiation, maintaining an electrical field in said chamber by means of a pair of electrodes, wherein the electrode surfaces defining the layer of gas are curved about a common centre at, or approximately at the source of the ionizing radiation, and collecting the ions generated in the gas layer on the surface of an insulated sheet.

In one form of the present invention the electrode surfaces may be spherical. Where the surfaces are cylindrical, the ionization chamber and the object will be moved relative to the x-ray source in such a way that the beam passing through the object is always normal to the electrode surfaces.

Figure 2:
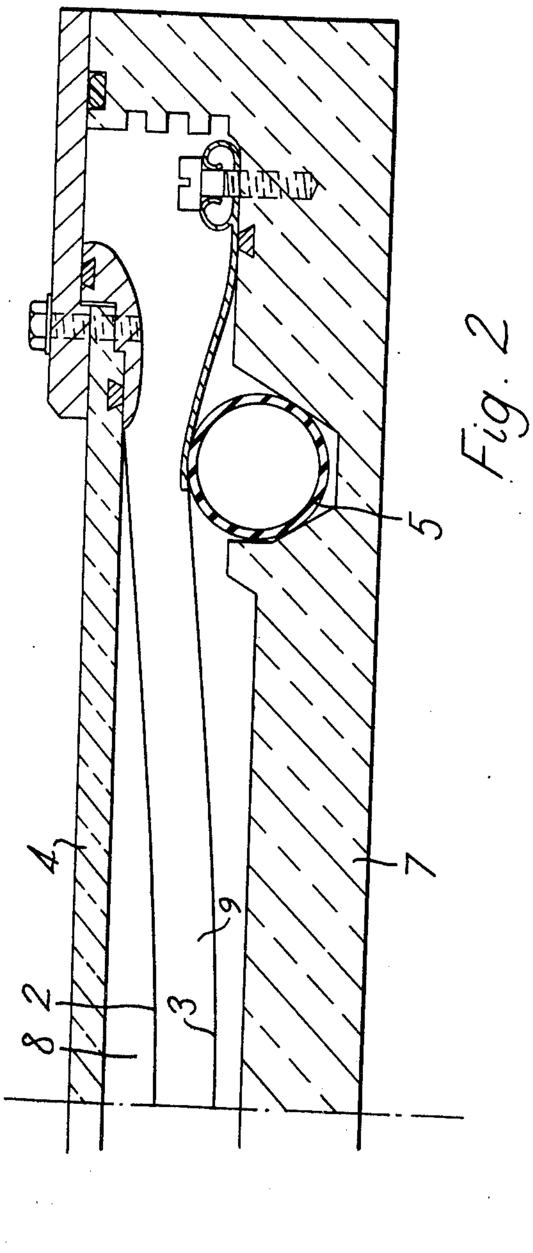
Figure 3:
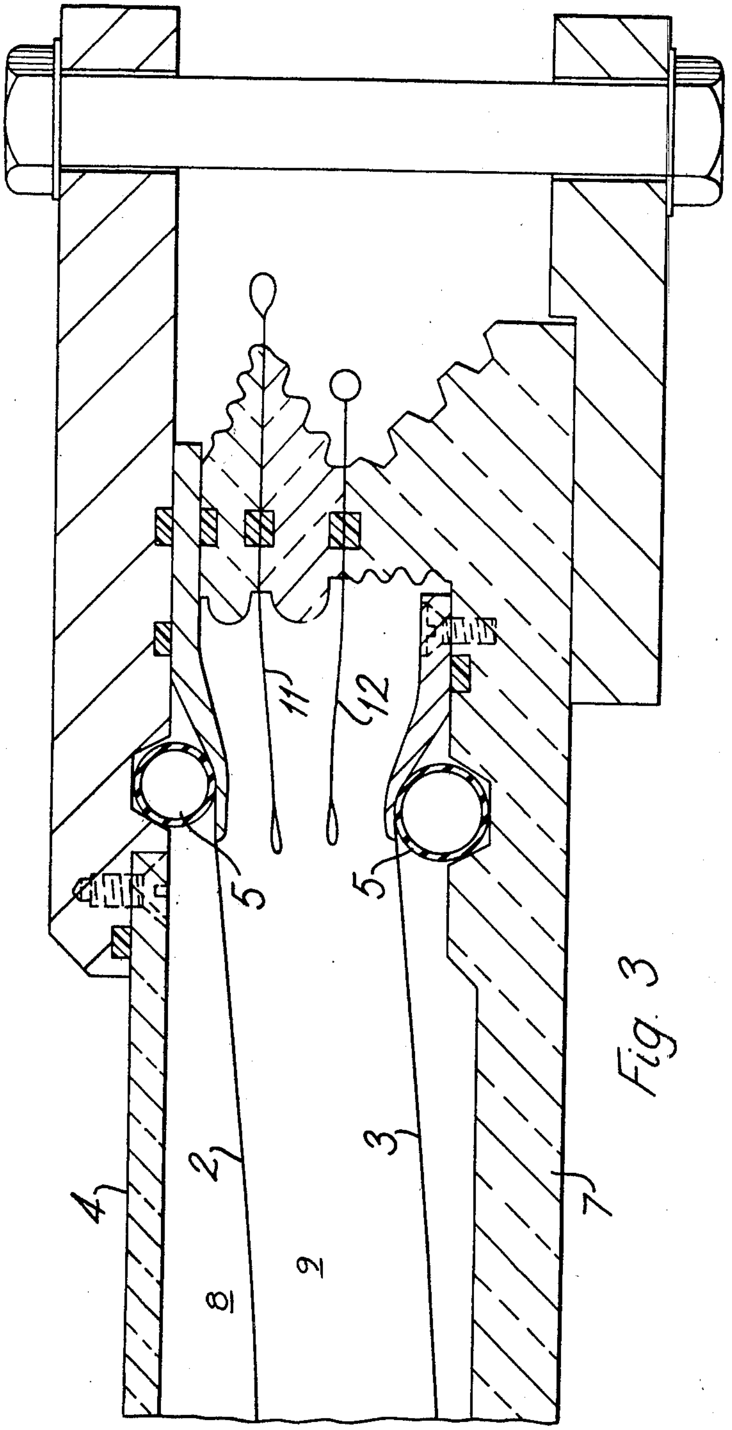
Figure 4:
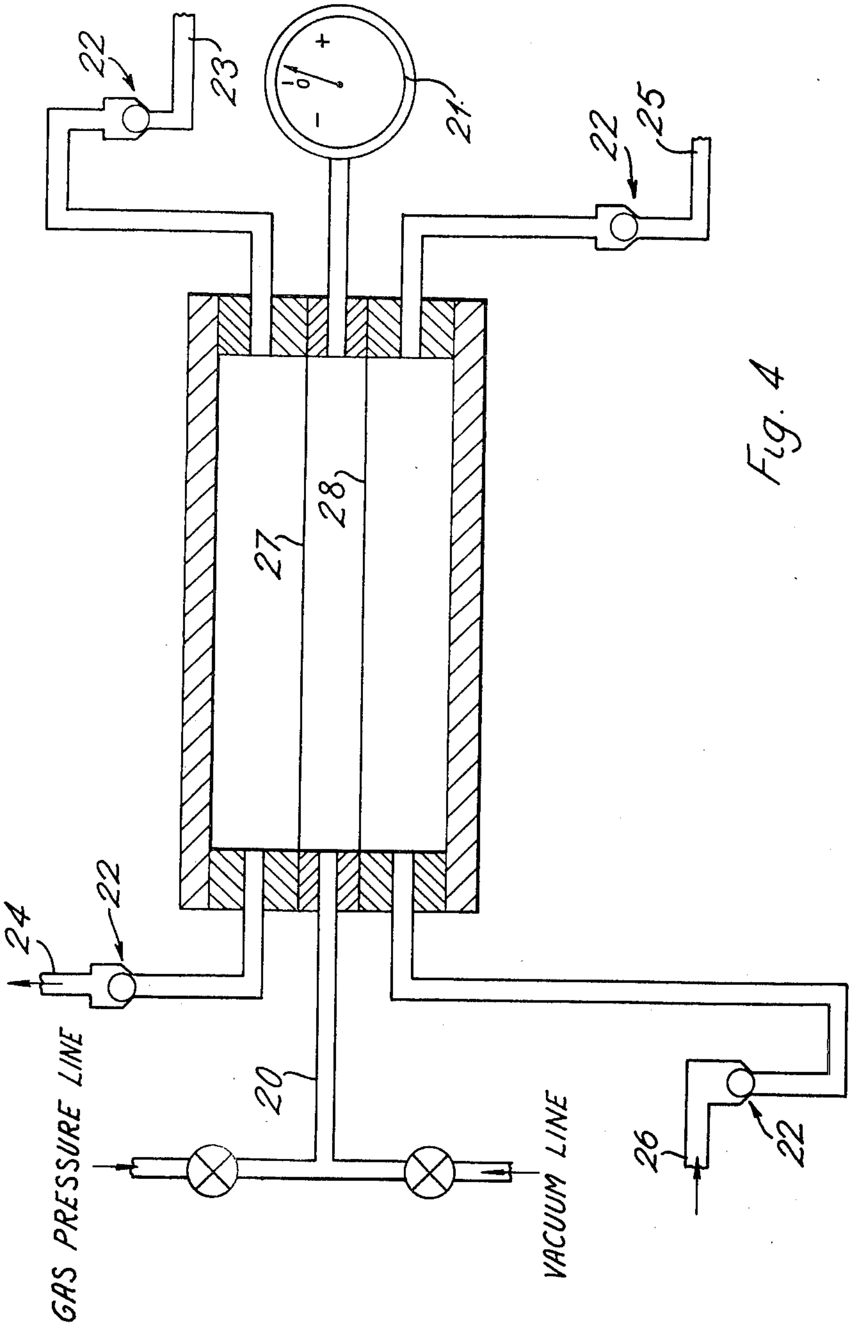
Figure 5:
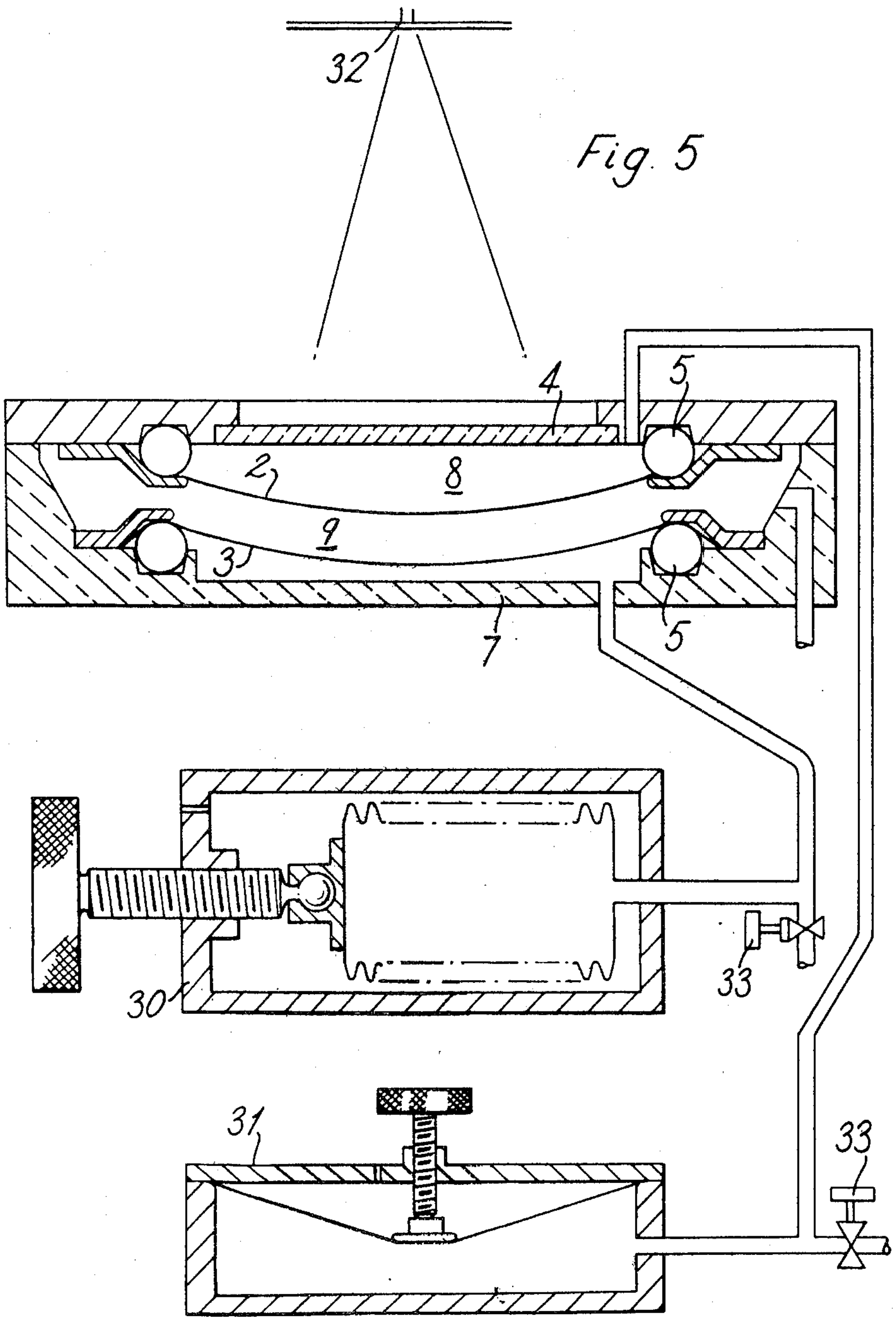
Figure 6:
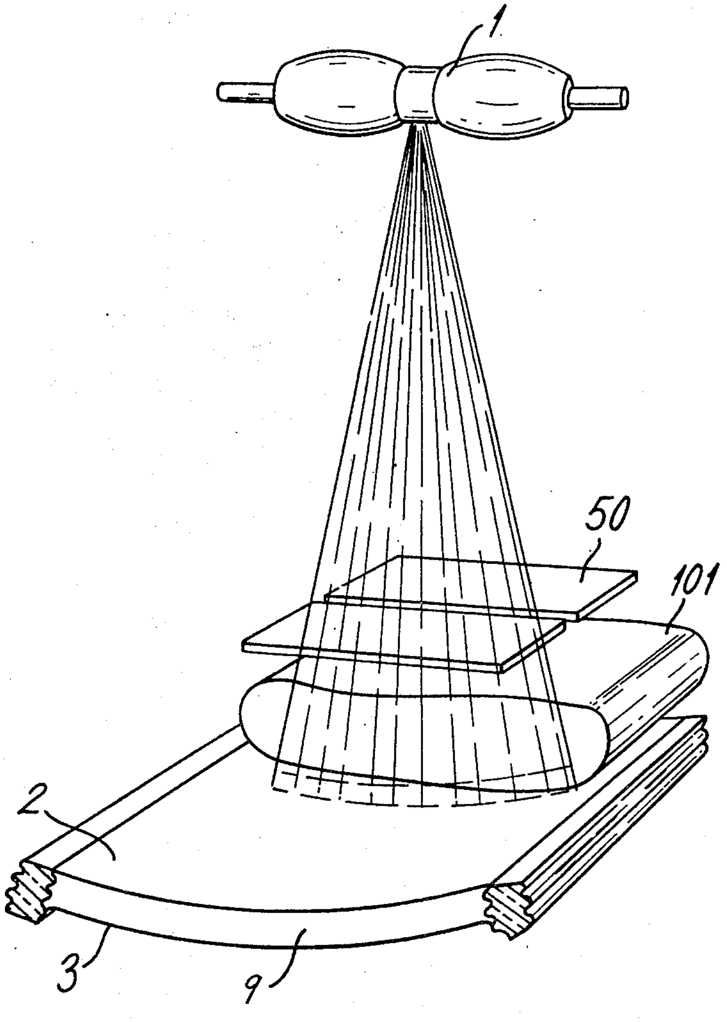
Figure 10:
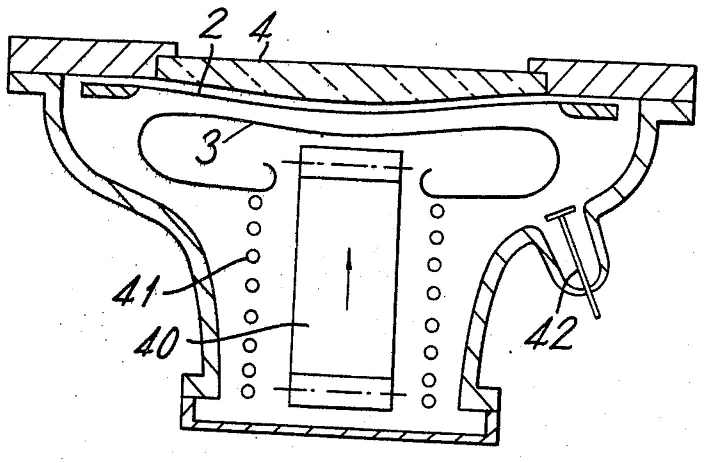

Various embodiments of the present invention will now be described by way of example and with reference to the accompanying drawings in which:

FIGS. 1, 2 and 3 are cross-sections through ionization chambers constructed in accordance with the present invention, FIG. 4 is a cross-section through a pressure equalisation chamber for use with ionization chambers according to the present invention, FIG. 5 is a cross-section through the ionization chamber and two alternative devices for the fine adjustment of the curvature of foils in the ionization chamber, FIGS. 6 and 7 are views of an alternative method of carrying out the present invention, FIGS. 8, 9*a*, 9*b* are cross-sections of equipment for use with ionization chambers constructed in accordance with the present invention and, FIG. 10 is a cross-section through an ionization chamber constructed in accordance with the present invention and having its own source of electric potential.

The ionographic apparatus shown in FIG. 1 comprises an x-ray head 1 of conventional nature shown generating ionizing radiation which is passing through an object 101 which is to be examined. The rays passed through the object fall on an ionization chamber having an upper electrode 2 formed by an insulating foil with a conductive coating on the side of the foil facing the x-ray head 1. The chamber also contains a spherically curved lower electrode 3; the centre of curvature of this electrode being coincident with the target in the x-ray head 1. The ionization chamber has an upper end plate 4 which can be made from perspex, carbon fiber, beryllium, or any other material showing low absorption for x-rays. An inflatable rubber or plastic tube 5 is provided for prestretching the upper electrode 2 to a desired tension while gas can be introduced into the chamber between the end plate 4 and the electrode 2 so that the pressure of the gas in combination with the inflated tube 5 causes the foil electrode 2, also, to have a spherical curvature with the center of curvature approximating on the x-ray source. This space 8 can be filled with air, nitrogen or any other suitable gas of low atomic number. Thus the foil 2 and the electrode 3 define a spherically curved chamber 9 for gas which can be introduced via a gas inlet 10. The gas used to fill the space 9 can be chosen if desired to match the x-radiation employed. Thus for molybdenum K radiation Freon 13 B1 would be a suitable gas. The body 7 of the ionographic chamber may be made from perspex or any other suitable insulating material and a high tension lead and connecting flange 6 is also provided so that the necessary potential can be applied across the electrodes.

In subsequent embodiments the same integers will have the same reference numerals. Thus FIG. 2 is an ionographic chamber in which both upper and lower electrodes 2 and 3, respectively, are formed of stretched foils having conducting backings. FIG. 3 shows a ionographic chamber in which the foil electrodes 2 and 3 are spaced substantially further apart than in the two previous embodiments and in which there is provided a pair of intermediate field control electrodes 11, 12. FIG. 4 shows a pressure equalization chamber for preventing any significant pressure difference across the electrodes 2 and 3 of either of the embodiments of FIGS. 2 and 3 during evacuation and filling of the space 9 between the electrodes. Thus 20 is an inlet tube for filling or evacuating the central driving chamber of this device and 21 is a pressure and vacuum gauge. 22 are non-return valves preventing the return of gas into the pressure equalisation chamber while 23 is an inlet for the gas which is to inflate the gas space 8 to give the necessary curvature to the foil electrodes. The outlet 24 is to lead the gas to the space 8. Similarly the inlet 25 and outlet 26 are for providing the gas which is to fill the space 9. Slack flexible membranes 27, 28 separate these two gas paths so that by controlling the pressure of the gas between the membranes 27, 28 control can be maintained over the pressures obtaining in the spaces 8 and 9. FIG. 5 shows an ionization chamber similar to those described previously having two foil electrodes 2 and 3 and furthermore shows two types of variable volume chambers 30, 31 either of which can be used to adjust the pressure in the volume 9 after the gas has been introduced into this area via the inlet valves 33 and the valve closed. The curvature of the upper electrode 2 can be accurately determined by shining a light 32 from the point where the x-ray head would be during the examination of an object and then adjusting the size of the spot of light reflected back from the upper surface of the electrode 2 on the screen surrounding the light 32 to as small a size as possible thus ensuring that the light 32 is at the center of curvature of the upper electrode.

The embodiments so far described have involved spherically shaped electrodes. Using these embodiments produces approximately circular x-ray pictures and the next two embodiments are concerned with maintaining the advantages of the previous embodiments and adding the further advantage that a high resolution rectangular picture of any desired size can be produced. Briefly, the necessary coincidence between the paths of the primary x-ray quanta and the lines of force of the collecting field can be preserved by using coaxial cylindrical electrodes with common axes at the x-ray target spot instead of the spherical geometry described previously, provided that at any one moment only a narrow band of the ionization chamber is irradiated within which band the quantum paths and lines of force of the collecting field are sensibly parallel. This may be achieved, as illustrated in FIG. 6 by moving the object to be x-rayed together with the ionization chamber in a direction parallel to the axis of the cylindrical electrode system, while restricting the form of the x-ray beam to a wedge of narrow angle. This wedge of radiation may be formed by a slotted shield of lead 50 or other absorbing material sliding above the ionization chamber and a similar slotted shield moving above the object, the two shields being coupled either mechanically or electrically with one another so that the two slots define the same wedge of radiation. If preferred, the upper slotted shield may define a somewhat broader wedge and the lower slotted shield accept only the central portion of this radiation wedge which has passed through the object, thus relaxing slightly the requirement for unduly high accuracy in the alignment of the two slots. Thus FIG. 6 shows such an arrangement with the electrodes 2 and 3 being cylindrical.

An alternative way of achieving constant coincidence between the paths of the primary quanta and the lines of force of the collecting field is illustrated in FIG. 7. By this method the x-ray tube 1 is rotated about an axis passing through the x-ray target spot and at the same time the plane of the ionization chamber 51 is tilted so that the central ray of the x-ray beam always strikes the concave cylindrical surfaces of the electrodes at right angles. The cross section of the x-ray beam is again restricted by a suitable slotted shield 50 in this case fixed to the x-ray tube and moving with it to produce a flat wedge-shaped beam passing through the object and impinging normally on the electrode surfaces. By means of this coupled motion of the x-ray tube and of the concave cylindrical surfaces of the ionization chamber, the direct rays from the x-ray target, which are those involved in the formation of the latent image, always lie closely coincident with the lines of force of the collecting field and there is no loss of resolution due to incorrect geometry.

In the final embodiment shown in FIG. 10 a disadvantage present in some of the previous systems has been eliminated. This is the necessity for an external power supply to provide the static field between the electrodes. The reasons for such a high field are as follows:-

Notwithstanding the fact that electron avalanche amplification cannot be used to give a large increase in sensitivity (say, by a factor of 500 to 1000) without destroying resolution in the final image, it is still possible to use some degree of avalanche amplification and thus obtain a useful increase of sensitivity by a factor of, say, 5 to 10. To do so, however, in an ionisation chamber with a gap of about 1 cm filled with an ion-forming gas to 5 to 10 atmospheres pressure would require a very high and closely controlled field strength between the electrodes. The necessary voltage may exceed 100 kV and it would therefore be difficult to introduce this safely into the high pressure ionization chamber. The difficulty can be overcome by generating the necessary potential by a small electrostatic generator 41 inside the pressure vessel itself. An insulating band 40, generator with frictional or corona current feed operating in the high pressure gas could provide adequate current and be capable of very precise voltage control by using a simple form of one or other of the devices which have been developed for voltage control on the Van de Graaff generators used in nuclear physics research. Naturally a rotating disc or dust current generator could also be used.

One important advantage of an ionization chamber designed in accordance with the principles set out in this specification is that scattered radiation from the object does not seriously affect the image, particularly when a development method is employed which enhances edge contrast. The fixed or moving grids habitually employed to improve the quality of silver emulsion radiographs are therefore in general unnecessary, with consequent reduction of the radiation dose received by a patient undergoing a diagnostic x-ray examination.

The system of ionography described herein allows certain procedures which are of value in medical diagnosis to be performed much more simply than hitherto. Thus the technique of "subtraction radiography" whereby two pictures are taken of the patient, one immediately before and the other somewhat after an injection of contrast medium is made into a blood vessel, lymph duct or other cavity whose outline or structure it is desired to render visible, can be performed much more simply by ionography, using the type of apparatus described in this specification. Instead of the tedious and lengthy process involved in preparing two separate film images, registering them precisely with respect to one another and then subtracting one image from the other in order to bring out clearly the only differences - viz. the injected vessels - it is possible, in ionography, to perform the subtraction procedure electrically, simply by reversing the polarity of the collecting field on the ionization chamber between the first exposure and the second. In this way all those parts of the first latent image representing parts of the object whose transparency to x-rays has not changed will be obliterated by receiving an equal amount of charge of the opposite sign, and only those parts where some change in transparency has occurred - e.g. vessels now filled with contrast medium - will remain in the latent image. The 'subtraction picture' is then obtained immediately by developing the residual latent image. Since the reversal of polarity on the ionisation chamber can be made very rapidly by electronic devices, processes which are too rapid to be investigated by existing conventional subtraction techniques employing silver halide emulsion film will become accessible to study. A moving object in the presence of confusing stationary surroundings can likewise be made to stand out clearly by such a technique, using a pulsed x-ray beam.

An important advantage of ionography is the cheapness of the basic recording medium - plastic foil - and the wide range of development methods available. Among these is the use of liquid crystals, and by this method it should be possible to view the image immediately after the radiation exposure provided a transparent viewing window is provided, and to erase it again by irradiation or by temperature change. Alternatively the foil may incorporate other types of optically active molecules and be viewed in polarised or coherent light.

The conducting coating normally necessary on the reverse side of the plastic foil which holds the latent charge image may be transparent (thin gold coating, oxides of indium and tin or other coating) and the developed film may then be viewed by transmitted light, which will under some circumstances reveal more detail than viewing by reflected light.

Alternatively, the conducting coating may be omitted and the foil placed centrally in the ionization chamber (see FIG. 8) so that positive ions are collected on one side and an equal charge of negative ions on the other, the ions of opposite sign holding one another in position by their mutual attraction and cancelling to near zero the net charge on the foil. A foil charged in this way can then be developed on both surfaces using any of the methods already referred to - powder cloud, liquid development, incorporated or applied substances with optically active properties. It is important for this variation of the basic idea that the foil be held accurately in such a position that the opposite charges received on the two siees of the foil shall be equal in magnitude. The correct position will normally be near the geometrical center of the gas space, but in a high efficiency chamber in which a considerable proportion of the incident X-ray beam is absorbed in the gas the foil must lie somewhat closer to the electrode by which the X-ray beam enters the gas space than to the opposite electrode - the appropriate position being determined by calculation and experimental testing.

One problem experienced in handling rolls of insulating plastic foil is the induction of haphazard charge distributions by friction or simply by separating the film from the roll. Such random charge distributions must be eliminated from the foil before it is exposed to the radiation beam, otherwise they will be superimposed upon, and distort, the latent image of the object x-rayed. There are two ways of avoiding this:

1. The foil may be precharged, by a corona charging device, to a uniform density of charge of either polarity. The electric field in the ionisation chamber will then be arranged so that the ions collected on the foil are of opposite sign to the initially uniform charge coating. By this means they will leave on the foil a negative image of the charge pattern collected from the irradiated gas and this pattern will be developed in the same way as the positive pattern obtained on an uncharged foil.

2. Any random charge distribution due to friction or unrolling the foil may be eliminated by pre-irradiating the foil surface, or both surfaces in the case of an unbacked foil, by a low voltage X-ray beam incorporated in the apparatus before the foil enters the image-forming ionization chamber. The K X-radiation from a target of aluminum or some other low atomic number material is highly suitable for this purpose and an extremely simple design of X-ray tube excited at about 10 to 20 kilovolts in which the window serves also as target, will be adequate for the pre-irradiation procedure. (FIGS. 9*a*,*b*). The output from such a device will be sufficient to discharge the foil rapidly and stray radiation will be very easily shielded from other parts of the apparatus.

The gas Freon 13-B1, whose composition is $CF_3Br$, is particularly suitable as one component of the gas mixture used in image forming ionization chambers because of its large electron affinity which enables it to capture any free electrons liberated in the gas mixture and form negative ions. One result of this is to confer increased electric strength on the mixture - i.e. the gas layer will support a larger ion collecting voltage. Other electronegative gases such as Freon 12 ($CCL_2F_2$) may be used instead. Other preferred components in the mixture are gases containing atoms of high atomic number or in the case of low voltage x-ray beams gases having absorption edges lying slightly above the quantum energy of the radiation used.

What we claim is:

1. An apparatus for taking X-ray pictures of an object comprising:

a source of ionizing radiation, a housing, a pair of electrodes in said housing defining an ionization chamber, at least one of said electrodes being in the form of a flexible sheet which includes a conductive layer and an insulating layer for collecting on the surface thereof ions generated in said chamber, both of said electrodes having substantially spherically curved surfaces with their respective centers of curvature being located at said source of ionizing radiation, means for establishing a differential gas pressure across said at least one flexible sheet for forming said at least one flexible sheet into a spherically curved shape having a center of curvature at said source of ionizing radiation, means for applying a potential difference across said electrodes, and means for introducing into said ionization chamber an ionizing radiation absorbing gas.

2. The apparatus of claim 1 wherein said pressure differential establishing means includes gas inlet means for introducing gas under pressure between said housing and said at least one flexible sheet to thereby form said at least one flexible sheet into spherically curved shape having a center of curvature at said source of ionizing radiation.

3. The apparatus of claim 1 wherein both of said electrodes are flexible and wherein a pressure differential is established across both of said flexible sheets to thereby form said flexible sheets into spherically curved shapes having a common center of curvature at said ionization source.

4. The apparatus of claim 1 further comprising means for adjusting the tension and hence the radius of curvature of said at least one flexible electrode.

5. The apparatus of claim 4 wherein said tension adjusting means includes at least one annular bearing surface fixedly secured in said housing and a circular inflatable tube positioned between said housing and said bearing surface, said at least one flexible electrode being positioned between said inflatable tube and said bearing surface wherein when said inflatable tube is fully inflated, said flexible electrode is maintained in position within said housing and wherein when said inflatable tube is deflated, said at least one flexible electrode is capable of being removed from said housing.

6. A method of taking X-ray pictures of an object in an apparatus of the type including a source of ionizing radiation, a housing, a pair of electrodes in said housing defining an ionization chamber wherein at least one of said electrodes is in the form of a flexible sheet which includes a conductive layer and an insulating layer, and means for applying a potential difference across said electrodes, said method including the steps of:

introducing an ionizing radiation absorbing gas between said electrodes to define therebetween an ionization chamber, and establishing a pressure differential across said at least one flexible sheet for forming said at least one flexible sheet into a spherically curved shape having a center of curvature at said source of ionizing radiation, the other of said electrodes having a spherically curved surface concentric with said flexible sheet.

7. The method of claim 6 wherein said apparatus includes a first annular bearing surface and an inflatable tube positioned between said housing and said bearing surface and further comprising the steps of:

positioning said at least one flexible sheet between said bearing surface and said inflatable tubing, and inflating said tubing before said pressure differential is established to thereby maintain said flexible sheet in position, and after said insulating layer has been exposed to ions from said ionization chamber, deflating said inflatable tube to thereby release said at least one flexible sheet.

* * * * *

UNITED STATES PATENT OFFICE

CERTIFICATE OF CORRECTION

PATENT NO. : 3,963,924

DATED June 15, 1976

INVENTOR(S) : John W. Boag, Paul N. Jeffrey & Harold E. Johns

It is certified that error appears in the above-identified patent and that said Letters Patent are hereby corrected as shown below:

In the heading:

Item [30] Foreign Application Priority Data read "June 23, 1973" as --June 27, 1973--

Signed and Sealed this

Twenty-third Day of November 1976

[SEAL]

*Attest:*

RUTH C. MASON
*Attesting Officer*

C. MARSHALL DANN
*Commissioner of Patents and Trademarks*